United States Patent [19]
Allen et al.

[11] 3,724,170
[45] Apr. 3, 1973

[54] STAGED SEPARATIONS OF AROMATIC MIXTURES WITH ZEOLITES

[75] Inventors: Paul T. Allen; B. M. Drinkard; Edward H. Unger, all of Beaumont, Tex.

[73] Assignee: Mobil Oil Corporation, New York, N.Y.

[22] Filed: Sept. 13, 1971

[21] Appl. No.: 179,917

[52] U.S. Cl. ..........................................55/67, 55/75
[51] Int. Cl. ..............................................B01d 15/08
[58] Field of Search............55/67, 75, 197, 386, 389; 73/23.1; 260/674

[56] References Cited

UNITED STATES PATENTS

3,285,701  11/1966  Robertson ...............................55/67
3,295,296  1/1967  Halasz et al. ...........................55/386

*Primary Examiner*—Charles N. Hart
*Attorney*—Oswald G. Hayes et al.

[57] ABSTRACT

An improved method for the separation and isolation of individual components contained in a $C_8$ aromatic mixture such as a p-xylene and ethylbenzene, by contacting the mixture with an aluminosilicate zeolite in stages and recovering the components. It is preferred to use as the zeolite one which has been contacted with an organic-radical substituted silane to modify the characteristics of the zeolite.

16 Claims, 1 Drawing Figure

STAGED SEPARATIONS OF AROMATIC MIXTURES WITH ZEOLITES

BACKGROUND OF THE INVENTION

1. Field of the Invention

This invention relates to the gas chromatographic separation of $C_8$ aromatic mixtures and more particularly to a chromatographic method carried out in stages for the separation of such a mixture so as to recover essentially pure p-xylene and ethylbenzene.

2. Description of the Prior Art

Gas chromatography, as a method for the separation of mixtures of difficultly separable materials, has been well known for some time. In general, the method operates on the principle of distribution of the components of a sample over separate phases and subsequent separation of these phases. For example, in gas-liquid chromatography, the volatile components of a sample are distributed between an inert gas phase (carrier gas) and a stationary liquid. Similarly in adsorption chromatography, there is obtained sample distribution over a solid absorbent and a moving liquid phase. Columns packed with the stationary liquid or solid adsorbent are usually employed to effect the separations by passage of the mixture to be separated therethrough. Hence, chromatography is a physical method of separation in which the components to be separated are distributed between two phases, one of the phases constituting a stationary bed of large surface area, the other being a fluid that percolates through or along the stationary bed.

While chromatography has been applied to the separation of many difficultly separable mixtures with great success, the separation of close-boiling isomeric mixtures has not been particularly successful. One such mixture is $C_8$ aromatics and especially a mixture of ethylbenzene, ortho-xylene, meta-xylene and para-xylene, particularly on a production scale and in a very high state of purity. Para-xylene, in particular, is required in a very high state of purity for the manufacture of terephthalic acid which is an intermediate in the manufacture of synthetic fibers such as "Dacron". The ethylbenzene is also an important intermediate for making styrene by dehydrogenation. Normally they are separated from a product stream containing ethylbenzene, para-xylene, meta-xylene and ortho-xylene by costly superfractionation and multistage refrigeration steps. This process involves high operation costs and has a limited yield.

It has also long been known that porous substances such as silica gel, activated char, and certain zeolites, have certain selective adsorption characteristics useful in resolving a hydrocarbon mixture into its component parts. Thus, silica gel is selective in removing aromatic hydrocarbons from non-aromatic hydrocarbons and activated chars are useful in separating olefins from mixtures with paraffins. Similarly, the molecular sieve properties of zeolites have been utilized to selectively remove one molecular species from a mixture of the same with other species.

Although a wide variety of zeolitic materials, particularly crystalline aluminosilicates, have been successfully employed in various separation schemes, nevertheless, these prior art processes, in general, fell into one or two main categories. In one type, a zeolite is employed having a pore size sufficiently large to admit the vast majority of components normally found in a process stream. These molecular sieves are referred to as large pore zeolites and they are generally stated to have a pore size of about 13A such as zeolite X, Y, and L. The other type of crystalline aluminosilicates are those having a pore size of approximately 5A which are utilized to separate small molecules such as n-paraffins to the substantial exclusion of other molecular species. The zeolites of these types, however, are not generally capable of effectively separating the close-boiling $C_8$ aromatics.

Another proposed solution to this problem is set forth in U.S. Pat. No. 3,126,425. This patent discloses contacting a mixture of xylene isomers with crystalline aluminosilicates such that the ortho- and meta-isomers are sorbed by said aluminosilicates and the para-isomer is concentrated in the unadsorbed portion. This method is concerned with the concentration of the more symmetrical disubstituted aromatic isomer, such as para-xylene, in the unadsorbed stream. It therefore apparently represents an extension of the normal relative partitioning of xylene isomers with high surface area solids to the more selective crystalline aluminosilicate surface. All of the isomers described in the above patent will be sorbed by crystalline aluminosilicates having uniform pore openings of 10–13 Angstrom units. The separations shown are therefore not dependent on the molecular sieving properties of the 13 Angstrom zeolite, but rather, on the relative partitioning of the said isomers between the intracrystalline sorbed phase and the free liquid phase. This method is therefore severely limited and may as stated be restricted because of economic considerations to processing only streams containing 50 percent or more para-xylene. The normal concentration of paraxylene in equilibrium mixtures of xylene isomers obtained from commercial isomerization units is generally about 24 weight percent so that this method will not accomplish the desired separation on feeds such as this.

In still a later development by Applicants' assignee, it was discovered that selective separations of this type can be achieved by utilizing a unique class of crystalline aluminosilicates which possess unique molecular sieving properties in that they allow entry and egress to their internal pore structure of not only normal paraffins but also of slightly branched paraffins and yet have the ability to effectively exclude paraffins possessing quaternary carbon atoms at short contact times. These zeolites also possess the ability to selectively sorb simple, lightly-substituted monocyclic hydrocarbons from mixed hydrocarbon streams containing highly-substituted monocyclic, polycyclic, heterocyclic or even simple polycyclic hydrocarbons. These zeolites also possess the unique property of selectively sorbing 1,4-disubstituted aromatic compounds in admixture with 1,2-, 1,3-, or more highly substituted aromatic hydrocarbons. Para-xylene, for example, can be selectively separated from ortho- and meta-xylene by contacting said mixture with this unique class of zeolites. This discovery is fully disclosed and claimed in copending J. Cattanach application Ser. No. 882,692, filed Dec. 5, 1969, of Applicants' assignee.

In subsequent developments by Applicants' assignee, and as set forth in U.S. Pat. Nos. 3,653,184 and 3,656,278 by B. M. Drinkard et al., there are disclosed gas chromatographic separations of aromatic mixtures for the recovery of ethylbenzene o-xylene, m-xylene and p-xylene by contacting a $C_8$ aromatic mixture with a certain crystalline zeolite to recover ethylbenzene, a mixture of m- and o-xylene and p-xylene and then separating the m- and o-xylene over a liquid phase partitioning agent (U.S. Pat. No. 3,656,287). In U.S. Pat. No. 3,653,184 the mixture is first contacted with the partitioning agent to separate ethylbenzene, o-xylene and a mixture of m- and p-xylenes. The latter is then separated over the zeolite. The crystalline aluminosilicate zeolites employed in the process of these copending applications are disclosed as being ZSM-5 and ZSM-8 zeolites.

In addition, in application Ser. No. 13,784 of George T. Kerr, entitled, ZEOLITE ESTERS, filed Feb. 24, 1970 of Applicants' assignee, there are disclosed as novel compositions of matter, crystalline aluminosilicate esters made by reacting a crystalline aluminosilicate having available hydrogen atoms with an organic silane having an SiH group. The resulting compositions are indicated as being useful for hydrocarbon conversion processes, particularly hydrocracking.

Still further, in copending application Ser. No. 149,050 filed June 1, 1971, now U.S. Pat. No. 3,698,157 entitled, SEPARATION OF MIXTURES WITH MODIFIED ZEOLITES of Applicants' assignee, it is disclosed that modified ZSM-5 and ZSM-8 type crystalline aluminosilicate zeolites, wherein the modification is carried out by contacting the zeolites with organic radical-substituted silanes provide unexpected and advantageous results in the gas chromatographic separation of the mixture of compounds contained in a $C_8$ aromatic feedstock.

The present invention provides an improved procedure for effectively separating aromatic mixtures by chromatographic methods.

SUMMARY OF THE INVENTION

It is accordingly one object of the invention to provide a process which overcomes or otherwise mitigates the disadvantages of prior work in this area.

A further object of the invention is to provide a chromatographic separation process for the separation and isolation of mixtures of compounds contained in $C_8$ aromatic mixtures wherein the chromatographic separation is conducted in stages over a zeolite absorbent.

A still further object is to provide a gas chromatographic separation process for the recovery of highly pure p-xylene and/or ethylbenzene from a $C_8$ aromatic mixture employing in the chromatographic column a modified crystalline aluminosilicate zeolite and wherein the chromatographic separation is conducted in stages.

Other objects and advantages of the present invention will become apparent as the description thereof proceeds.

In satisfaction of the foregoing objects and advantages there is provided by this invention a process for the treatment of a $C_8$ aromatic feedstock for the recovery and isolation of substantially pure p-xylene which comprises contacting a $C_8$ aromatic feedstock with a crystalline aluminosilicate adsorbent in a chromatographic separation process carried out in stages.

In a preferred aspect of the process, the adsorbent is a ZSM-5 or ZSM-8 crystalline aluminosilicate zeolite which has been modified by reaction with an organic radical-substituted silane.

BRIEF DESCRIPTION OF THE DRAWING

Reference is now made to the drawing accompanying the application where there is shown a schematic outline of a method and apparatus suitable for practicing the process of the invention.

DESCRIPTION OF PREFERRED EMBODIMENTS

As pointed out above, the process of the present invention is concerned with the separation of difficultly separable mixtures of aromatic compounds and particularly the separation of $C_8$ aromatics for the recovery of highly pure para-xylene and its separation from meta-xylene, ortho-xylene and ethylbenzene. According to this invention it has been found that when this separation is conducted under chromatographic conditions, unexpectedly superior results are achieved when operating in the presence of an adsorbent comprising a crystalline aluminosilicate zeolite when the process is conducted in a staged manner. This means that when the process is conducted in chromatographic manner, such as in a chromatographic column containing the adsorbent, at least two distinct stages are utilized to effect the total separation. By two stages is meant that there can be used a single column with two or more distinct sections containing the adsorbent with condensers for the removal of products, or there can be used two or more of such columns in series wherein the feed and carrier progress through the number of columns used. It has been found quite unexpectedly that use of this technique serves to reduce the carrier gas requirements, increase the throughput of feed material and provide very high purity para-xylene product.

Generally in conducting processes of this type, the major problems have been that the para-xylene product purity has been too low and this is usually caused by meta-xylene and ortho-xylene peak tailing, that is, some of the meta-xylene and ortho-xylene are retained by the adsorbent and then eluted from the chromatographic column with the para-xylene. Obviously, this would interfere with the desired separation and prevent recovery of extremely high purity para-xylene. A second problem has been inadequate throughput, that is, the amount of feed which can be processed through the column in a certain amount of time has been too small for commercial attractiveness. The third problem has been the requirement for extensive carrier gas to feed throughput ratio meaning that a great deal of carrier gas is required to process the feed through the column. The process of the present invention overcomes all of these problems to a considerable extent.

As mentioned above, it was found previously and is disclosed in the above-identified copending applications that the crystalline aluminosilicate molecular sieves identified as ZSM-5 and ZSM-8 and described more fully hereinafter are unique adsorbents for effecting the desired separations. With these adsorbents, the meta-xylene and ortho-xylene are not adsorbed whereas para-xylene and ethylbenzene are adsorbed in the elliptical pores of the zeolite. Thus in the process as described in the prior filed applications, the para-xylene and ethylbenzene are easily separated from meta-xylene and ortho-xylene and the para-xylene and ethylbenzene are then separated on elution thereof from the column.

It was found, however, in using these zeolites, that with inadequate throughput, that is the slowness of the feed in its progression through the column, with enough time some meta-xylene and ortho-xylene will be adsorbed by the adsorbent. Therefore, it was necessary to obtain rapid progression of the feed stock through the chromatographic column.

In a further development in this process it was found that ZSM-5 molecular sieves contain surface adsorption sites which contribute to peak tailing. These surface adsorption sites are deactivated by contacting the zeolites with an organic radical substituted silane as described in the copending application mentioned hereinbefore. It was found that these treated zeolites apparently have reduced adsorption sites on which meta-xylene and ortho-xylene would be retained and thereby peak tailing of meta-xylene and ortho-xylene can be reduced. Thus, the silane groups appear to be good masking agents for the adsorption sites and provided higher purity para-xylene.

It should be noted that the term "peak tailing" which is mentioned as describing the condition whereby some of the meta- and ortho-xylene are retained by the adsorbent and eluted on removal of the para-xylene, is really another word for surface adsorption. Thus, what is meant is that these impurities are adsorbed on the surface or into the pores of the adsorbent and are then released on elution of the product from the column.

According to this invention it was found that if the process was conducted by effecting the separation in stages, a higher para-xylene product purity could be obtained, the feed throughput could be increased, the carrier gas requirements could be reduced to an acceptable level, and peak tailing would be minimized. Thus it was found that by using single columns with two or more stages and/or two or more columns where each column is a single stage, that the carrier gas requirements can be reduced to about 12–15 moles of carrier gas per mole of feed. This is in contrast to the previous requirements of as high as 24 moles of carrier gas per mole of feed. Higher operating temperatures were also found to be beneficial. In addition, it was found that a throughput could be obtained on the order of about 0.4 grams of feed per hour per gram of adsorbent as opposed to the previous runs conducted without staging on the order of 0.1 to 0.2 gram of feed per hour per gram of adsorbent. Moreover, these advantages also serve to increase the effectiveness of the two stage process for meta-xylene and ortho-xylene removal and para-xylene and ethylbenzene resolution together with increased throughput and decreased carrier gas to feed ratio.

As mentioned the essence of the process is that it is conducted in stages. Thus, the feed and carrier gas are passed through at least two distinct sections of adsorbent or are contacted with the adsorbent at least two times. To achieve this two separate columns arranged in series, each containing adsorbent, or a single column with two distinct adsorbent sections in the column may be used. In practicing the process, each column or column section is provided with means for removing the unadsorbed meta-xylene and ortho-xylene mixture so that it is not allowed to pass into the next column or section. Cooling condensers are suitable for this purpose. It is also preferable that provision be made in the second and each subsequent column for chromatographic regulation of the elutant. Also, provision should be made for the addition of make-up carrier gas as required and indicated by the operating conditions and chromatographic profile.

As the separation process proceeds, the unadsorbed meta-xylene and ortho-xylene passing out of the first section or column are removed from the system as by condensation. Any remaining amount of this mixture will be similarly removed after each section or column although it is obvious that the majority of this mixture will be recovered as it is emitted from the first column or section. Meanwhile the para-xylene and ethylbenzene are eluted from the first column or section and passed into the next and succeeding columns or sections while observing proper chromatographic conditions. On exiting the final column or section, the para-xylene is recovered separate from the other components. With respect to this process, two or three columns or sections (i.e., two or three stages) are preferred.

It would be ordinarily expected that rechromatography of the feed would provide similar results to the present process as regards para-xylene product purity. Thus, on further consideration of the chromatographic parameters used, one might predict that 4 or 5 rechromatographing steps would realize a product purity equivalent to a two-stage process without condensation between stages. However, such was not the case.

Figure 1:
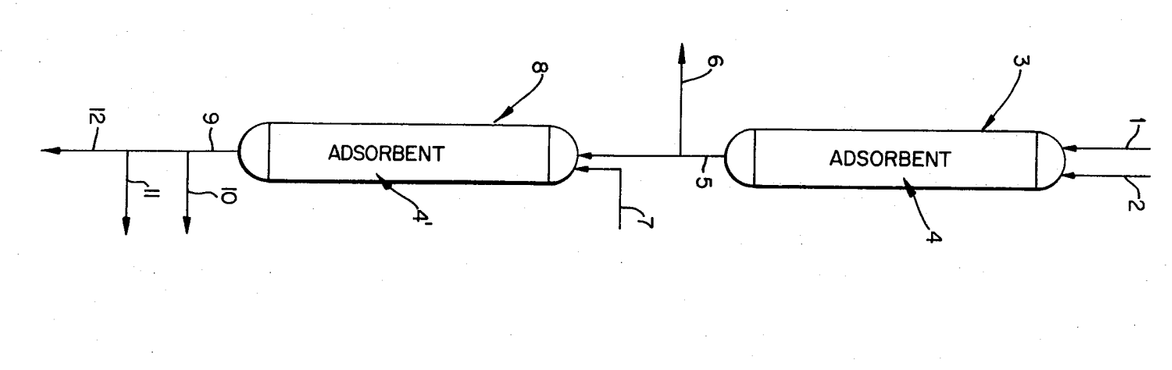

Reference is now made to the drawing wherein a specific embodiment of this invention is illustrated and where there will be seen schematically a two column set-up for conducting the present invention in stages. The two columns in this embodiment are of substantially equal size. Preferably, each column is provided with a multi-port valve on each end for feed rate regulation. Also, there is a cooling condenser at the end of the first column for meta-xylene and ortho-xylene recovery and three separate condensers at the end of the second column for recovery of each of the desired products.

In the process, feed is introduced through line 1 and carrier gas through line 2 into column 3 containing the adsorbent 4. The unadsorbed meta- and ortho-xylene mixture passes through the adsorbent, out line 5, and is removed by line 6 by use of a cooling trap or condenser. The adsorbed para-xylene and ethylbenzene are eluted and passed directly through line 5 into column 8 which contains adsorbent 4'. Make-up carrier gas is introduced through line 7. From this column any meta-xylene and/or ortho-xylene exits the column by line 9 and is removed through line 10 with a cooling trap. On elution, the para-xylene exits by line 9 and is recovered in line 11 by use of a cold trap or condenser. The eluted ethylbenzene is then eluted out line 9 and recovered in the same manner in line 12.

While this process is illustrated as being preferably conducted using a combination of two columns, it is obvious that more than two columns in the series could be employed and moreover the same effect is achieved in a single column with distinct and separate sections of adsorbent.

As pointed out above, it is preferred that the process be conducted in the presence of a crystalline zeolite absorbent and highly preferably a ZSM-5 or ZSM-8 type absorbent. Crystalline aluminosilicates of these types are described in the above-mentioned copending application and the parameters thereof given hereinbelow. More highly preferred adsorbents, however, are the ZSM-5 and ZSM-8 zeolites which have been treated by reaction with an organic radical substituted silane, also as described in the copending application and hereinbelow.

As has been stated, the separation process of this invention is a chromatographic one. This is intended to describe a process wherein separation is based on selective adsorption of at least one component of a mixture by a solid. The solid is the modified zeolite previously described.

In the novel chromatographic separation process of this invention the hydrocarbon mixture described, existing either as a gas, liquid or mixed phase is contacted with the modified crystalline zeolite in the stages described such that the desired component is concentrated in either the adsorbed or non-adsorbed phase. A suitable fluid carrier is usually employed, typical carriers including polar and non-polar compounds such as nitrogen, air, steam, water, hydrogen, hydrocarbons, helium, etc. The process can be carried out in either a batch or a continuous operation. The sorbed material can be subsequently recovered by conventional desorbing techniques such as thermal stripping, stripping with an inert gas, e.g., nitrogen, helium, etc. or evacuation or elutriation with a suitable polar or non-polar stripping agent, e.g., water, n-hexane, etc.

In one embodiment of the process of the invention, the $C_8$ aromatic feed mixture would contain about up to 15 weight percent of ethylbenzene, about 20 to 30 weight percent of para-xylene, about 40 to 50 weight percent of meta-xylene and about 15 to 25 weight percent of ortho-xylene. In this embodiment, contact of this mixture with the zeolite would first separate a mixture of the meta-xylene and ortho-xylene followed by the para-xylene and then the ethylbenzene.

In a second embodiment of the process, the $C_8$ aromatic feed mixture starting material contains no or very little ethylbenzene and a separation of para-xylene in high purity is effected. In this embodiment, a $C_8$ mixture of meta-, ortho- and para-xylene is admixed with a carrier and contacted with the modified zeolite. In typical liquid phase chromatography, the products are recovered from the column by elution with a liquid such as an organic solvent. In typical vapor phase operations, the products are eluted from the column by carrier gas.

In conducting the reaction the $C_8$ aromatic feed in contact with the carrier is passed through the chromatographic column containing the crystalline aluminosilicates. As the mixture passes through the stages of the column, the modification performed on the zeolite has the effect of reducing the meta- or ortho-xylene surface adsorption, as measured by peak tailing, and thereby improves para-xylene and ethylbenzene product purity. Thus, since adsorption of the meta- and ortho-xylene is reduced over the modified zeolite, the meta- and ortho-xylene mixture passes through the zeolite-packed column quickly and well ahead of the para-xylene and ethylbenzene. Thereafter the para-xylene is eluted followed by the ethylbenzene. Both of these latter products are of high purity.

The temperature at which the separations are carried out is important. Thus, the novel process of this invention can be carried out at temperatures ranging from about 100°C to about 250°C. It should be noted that a wider temperature range can be employed but because of the possibility of catalytic conversion by zeolite, 250°C. appears to be a suitable upper limit. A more preferred temperature range appears to be between about 100° to 200°C. It is noted that the above temperatures might vary slightly depending upon the particular cationic form of the crystalline aluminosilicate zeolite employed but, in general, they represent operable parameters for carrying out the novel process of this invention.

There may, of course, be used any of the active aluminosilicate zeolites known to the art as adsorbents for use in the process of this invention provided they effect the desired separations. However, the aluminosilicates known as ZSM-5 zeolites and ZSM-8 zeolites and described hereinafter are highly preferred. More highly preferred are ZSM-5 and ZSM-8 zeolites which have been reacted with silanes as described herein.

The ZSM-5 and ZSM-8 zeolites are disclosed and claimed for use in a novel zeolite chromatographic process in copending application Ser. No. 882,692, filed Dec. 5, 1969, now U.S. Pat. No. 3,699,182 of the same assignee. Generally, these zeolitic materials allow selective separations to be achieved depending on either the size, shape or polarity of the sorbate molecules. This class of novel crystalline aluminosilicates can generally be stated to have intermediate shape-selective sorption properties. The unique nature of this novel class of zeolites is characterized by the presence of uniform pore openings which are apparently elliptical rather than circular in nature. The effective pore openings of this unique class of zeolites have both a major and minor axis, and it is for this reason that the unusual and novel molecular sieving effects are achieved. The unique type of molecular sieving produced has generally been referred to as a "keyhole" molecular sieving action. From their dynamic molecular sieving properties it would appear that the major and minor axis of the elliptical pore in this family of zeolites have effective sizes of about 7.0 ± 0.7A and 5.0 ± 0.5A, respectively.

This general family of zeolites are described as ZSM-5 type compositions. In general, they have the characteristic X-ray diffraction pattern set forth in Table 1 hereinbelow. ZSM-5 compositions can also be identified, in terms of mole ratios of oxides, as follows:

$$0.9 \pm 0.2\ M_{2/n}O : 5\text{--}100\ YO_2 : z\ H_2O$$

wherein M is a cation, $n$ is the valence of said cation, W is selected from the group consisting of aluminum and gallium, Y is selected from the group consisting of silicon and germanium, and z is from 0 to 40. In a more preferred synthesized form, the zeolite has a formula, in terms of mole ratios of oxides, as follows:

$$0.9 \pm 0.2\ M_{2/n}O : Al_2O_3 : 5\text{-}100\ SiO_2 : z\ H_2O$$

and M is selected from the group consisting of a mixture of alkali metal cations, especially sodium, and tetraalkylammonium cations, the alkyl groups of which preferably contain two to five carbon atoms.

In a preferred embodiment of ZSM-5, W is aluminum, Y is silicon and the silica/alumina mole ratio is at least 10 and ranges up to about 60.

Members of the family of ZSM-5 zeolites possess a definite distinguishing crystalline structure whose X-ray diffraction pattern shows the significant lines set forth in Table 1 following:

TABLE 1

| Interplanar Spacing d(A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities, 100 I/I, where I is the intensity of the strongest line or peak, and d(obs.), the interplanar spacing in A, corresponding to the recorded lines, were calculated. In Table 1 the relative intensities are given in terms of the symbols, S = strong, M = medium, MS = medium strong, MW = medium weak and VS = very strong. It whould be understood that this X-ray diffraction pattern is characteristic of all the species of ZSM-5 compositions. Ion exchange of the sodium ion with other cations reveals substantially the same pattern with some minor shifts in interplanar spacing and variation in relative intensity. Other minor variations can occur depending on the silicon to aluminum ratio of the particular sample, as well as if it had been subjected to thermal treatment. Various cation exchanged forms of ZSM-5 have been prepared. X-ray powder diffraction patterns of several of these forms are set forth below in Table 2. The ZSM-5 forms set forth below are all aluminosilicates.

TABLE 2

X-Ray Diffraction ZSM-5 Powder in Cation Exchanged Forms d Spacings Observed

| As Made | HCl | NaCl | CaCl₂ | ReCl₃ | AgNO₃ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| — | — | 9.01 | 9.02 | — | 8.99 |
| 8.06 | — | — | — | — | — |
| 7.44 | 7.46 | 7.46 | 7.46 | 7.40 | 4.46 |
| 7.08 | 7.07 | 7.09 | 7.11 | — | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 | — | 5.38 | 5.37 | 5.38 | 5.37 |
| 5.13 | 5.11 | 5.14 | 5.12 | 5.14 | — |
| 4.99 | 5.01 | 5.01 | 5.01 | 5.01 | 5.01 |
| — | — | 4.74 | — | — | — |
| 4.61 | 4.62 | 4.62 | 4.61 | 4.63 | 4.62 |
| — | — | 4.46 | 4.46 | — | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | — | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| — | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 | — | — | 3.17 | 3.18 | — |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| — | — | — | — | 2.97 | — |
| — | 2.95 | 2.95 | 2.94 | 2.95 | 2.95 |
| 2.86 | 2.87 | 2.87 | 2.87 | 2.87 | 2.87 |
| 2.80 | — | — | — | — | — |
| 2.78 | — | — | 2.78 | — | 2.78 |
| 2.73 | 2.74 | 2.74 | 2.73 | 2.74 | 2.74 |
| 2.67 | — | — | 2.68 | — | — |
| 2.66 | — | — | 2.65 | — | — |
| 2.60 | 2.61 | 2.61 | 2.61 | 2.61 | 2.61 |
| — | 2.59 | — | 2.59 | — | — |
| 2.57 | — | 2.57 | 2.56 | — | 2.57 |
| 2.50 | 2.52 | 2.52 | 2.52 | 2.52 | — |
| 2.49 | 2.49 | 2.49 | 2.49 | 2.49 | 2.49 |
| — | — | — | 2.45 | — | — |
| 2.41 | 2.42 | 2.42 | 2.42 | 2.42 | — |
| 2.39 | 2.40 | 2.40 | 2.39 | 2.40 | 2.40 |
| — | — | — | 2.38 | 2.35 | 2.38 |
| — | 2.33 | — | 2.33 | 2.32 | 2.33 |
| — | 2.30 | — | — | — | — |
| — | 2.24 | 2.23 | 2.23 | — | — |
| — | 2.20 | 2.21 | 2.20 | 2.20 | — |
| — | 2.18 | 2.18 | — | — | — |
| — | — | 2.17 | 2.17 | — | — |
| — | 2.13 | — | 2.13 | — | — |
| — | 2.11 | 2.11 | — | 2.11 | — |
| — | — | — | 2.10 | 2.10 | — |
| — | 2.08 | 2.08 | — | 2.08 | 2.08 |
| — | — | 2.07 | 2.07 | — | — |
| — | — | — | 2.04 | — | — |
| 2.01 | 2.01 | 2.01 | 2.01 | 2.01 | 2.01 |
| 1.99 | 2.00 | 1.99 | 1.99 | 1.99 | 1.99 |
| — | — | — | 1.97 | 1.96 | — |
| 1.95 | 1.95 | 1.95 | 1.95 | 1.95 | — |
| — | — | — | — | 1.94 | — |
| — | 1.92 | 1.92 | 1.92 | 1.92 | 1.92 |
| 1.91 | — | — | — | 1.91 | — |
| — | — | — | — | 1.88 | — |
| 1.87 | 1.87 | 1.87 | 1.87 | 1.87 | 1.87 |
| — | 1.86 | — | — | — | — |
| 1.84 | 1.84 | — | — | 1.84 | 1.84 |
| 1.83 | 1.83 | 1.83 | 1.83 | 1.83 | — |
| 1.82 | — | 1.81 | — | 1.82 | — |
| 1.77 | 1.77 | 1.79 | 1.78 | — | 1.77 |
| 1.76 | 1.76 | 1.76 | 1.76 | 1.76 | 1.76 |
| — | — | 1.75 | — | — | 1.75 |
| — | 1.74 | 1.74 | 1.73 | — | — |
| 1.71 | 1.72 | 1.72 | 1.71 | — | 1.70 |
| 1.67 | 1.67 | 1.67 | — | 1.67 | 1.67 |
| 1.66 | 1.66 | — | 1.66 | 1.66 | 1.66 |
| — | — | 1.65 | 1.65 | — | — |
| — | — | 1.64 | 1.64 | — | — |
| — | 1.63 | 1.63 | 1.63 | 1.63 | 1.62 |
| — | 1.61 | 1.61 | 1.61 | — | 1.61 |
| 1.58 | — | — | — | — | — |
| — | 1.57 | 1.57 | — | 1.57 | 1.57 |
| — | — | 1.56 | 1.56 | 1.56 | — |

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE 3

| | Broad | Preferred | Particularly Preferred |
|---|---|---|---|
| OH—/SiO$_2$ | 0.07–1.0 | 0.1–0.8 | 0.2–0.75 |
| R$_4$N+/(R$_4$N++Na+) | 0.2–0.95 | 0.3–0.9 | 0.4–0.9 |
| H$_2$O/OH— | 10–300 | 10–300 | 10–300 |
| YO$_2$/W$_2$O$_3$ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75°C to 175°C for a period of about 6 hours to 60 days. A more preferred temperature range is from about 90° to 150°C, with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM-5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can also be identified, in terms of mole ratios of oxides, as follows:

$$0.9 \pm 0.2 \, M_{2/n}O : Al_2O_3 : 5\text{-}100 \, SiO_2 : z \, H_2O$$

wherein M is at least one cation, n is the valence thereof and z is from 0 to 40. In a preferred synthesized form, the zeolite has a formula, in terms of mole ratios of oxides, as follows:

$$0.9 \pm 0.2 \, M_{2/n}O : Al_2O_3 : 10\text{-}60 \, SiO_2 : z \, n_2$$

and M is selected from the group consisting of a mixture of alkali metal cations, especially sodium, and tetraethylammonium cations.

ZSM-8 possesses a definite distinguishing crystalline structure having the following X-ray diffraction pattern:

TABLE 4

| dA° | I/I$_o$ | I/I$_o$ | dA° |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 5 | 3 | 2.61 |
| 6.35 | 12 | 1 | 2.57 |
| 6.04 | 6 | 1 | 2.55 |
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |
| 3.59 | 2 | 2 | 1.95 |
| 3.47 | 6 | 2 | 1.91 |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM-8 can be suitably prepared by reacting a water solution containing either tetraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range SiO$_2$/Al$_2$O$_3$ — from about 10 to about 200

Na$_2$O/tetraethylammonium hydroxide — from about 0.05 to 0.020

Tetraethylammonium hydroxide/SiO$_2$ — from about 0.08 to 1.0

H$_2$O/tetraethylammonium hydroxide — from about 80 to about 200

Thereafter, the crystals are separated from the liquid and recovered. Typical reaction conditions consist of maintaining the foregoing reaction mixture at a temperature of from about 100°C to 175°C for a period of time of from about 6 hours to 60 days. A more preferred temperature range is from about 150° to 175°C with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230°F, for from about 8 to 24 hours. Of course, milder conditions may be employed if desired, e.g., room temperature under vacuum.

ZSM-8, described and claimed in Ser. No. 865,418, filed Oct. 10, 1969 of Applicants' assignee, is prepared utilizing materials which supply the appropriate oxide. Such compositions include sodium aluminate, alumina, sodium silicate, silica hydrosol, silica gel, silicic acid, sodium hydroxide and tetraethylammonium hydroxide. It will be understood that each oxide component utilized in the reaction mixture can be supplied by one or more initial reactants and they can be mixed together in any order. For example, sodium oxide can be supplied by an aqueous solution of sodium hydroxide, or by an aqueous solution of sodium silicate, tetraethylammonium cation can be supplied by the bromide salt. The reaction mixture can be prepared either batchwise or continuously.

The zeolites used in the instant invention can have the original cations associated therewith replaced by a wide variety of other cations according to techniques well known in the art. Typical replacing cations would include hydrogen, ammonium and metal cations including mixtures of the same.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of U.S. Patents including Nos. 3,140,249; 3,140,251; and 3,140,253.

Following contact with the salt solution of the desired replacing cation, the zeolites are then preferably washed with water and dried at a temperature ranging from 150°F to about 600°F and thereafter calcined in air or an inert gas at temperatures ranging from about 500°F to 1,500°F for periods of time ranging from 1 to 48 hours or more.

Prior to use, the zeolites should be dehydrated at least partially. This can be done by heating to a temperature in the range of 200° to 600°C in an atmosphere, such as air, nitrogen, etc. and at atmospheric or subatmospheric pressures for between 1 and 48 hours. Dehydration can also be performed at lower temperatures merely by using a vacuum, but a longer time is required to obtain a sufficient amount of dehydration.

In practicing the process, it may be desired to incorporate the zeolite with another material resistant to the temperatures and other conditions employed in the separation processes. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides.

Naturally occurring clays which can be composited with the zeolites include the montmorillonite and kaolin family, which families include the sub-bentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the ZSM-5 type zeolites can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-5 and inorganic oxide gel matrix vary widely with the crystalline aluminosilicate content ranging from about 1 to about 99 percent by weight and more usually, particularly when the composite is prepared in the form of beads in the range of about 40 to about 90 percent by weight of the composite.

Another embodiment of this invention resides in subjecting the zeolite ZSM-5 type to a mild steam treatment carried out at elevated temperatures of 800°F. to 1,500°F. and preferably at temperatures of about 1,000°F. to 1,400°F. The treatment may be accomplished in an atmosphere of 100 percent steam or in atmosphere consisting of steam and a gas which is substantially inert to the aluminosilicate. The steam treatment apparently provides beneficial properties in the aluminosilicate compositions and can be conducted before, after or in place of the calcination treatment.

Even more highly preferred adsorbents are ZSM-5 and ZSM-8 zeolites which have been treated or contacted with a silane compound as superior results are achieved using these products as adsorbents. The organic substituted silanes deemed useful in the process of the present invention are those of the following general formula:

wherein, in the above formula, R is an organic radical as described hereinafter and each $R_1$ is also an organic radical such as those defined below for the group R, a hydrogen atom or a halogen atom such as chlorine or bromine. Organic radicals which may be R or $R_1$ include alkyl of one and more preferably up to about 40 carbon atoms, alkyl or aryl carboxylic acid acyl wherein the organic portion of said acyl group contains about one to 30 carbon atoms and said aryl group contains about six to 24 carbon atoms, aryl groups of about six to 24 carbons, which may also be further substituted, alkaryl and aralkyl groups containing about seven up to about 30 carbon atoms. Highly preferred compounds falling within the above structure are those wherein R is alkyl of about 12 to 24 carbon atoms, i.e., the long chained alkyl groups, and each $R_1$ is hydrogen or chlorine. Highly preferred silanes are octadecyltrichlorosilane and dodecyltrichlorosilane. Organic silanes of the type useful in the process of the present invention are known in the art and may be prepared by known methods. For example, the tetrachloro substituted silane, $SiCl_4$, may be prepared by the reaction of chlorine and silica and the resulting product may then be reacted with the desired number of moles of a metal salt of the organic compound containing the radical for R or $R_1$ desired, by heating. Other silanes employed in the process of the present invention may be prepared by similar procedures, all of which are well known in the art.

The desired silane is then contacted with a zeolite of the type described hereinbefore, one requirement of the zeolite being that it have an available hydrogen for reaction. The silane should be selected so that steric hindrance problems are avoided. Thus in the above formula, R and only two $R_1$ should be organic radicals which means that at least one $R_1$ should be halogen.

The selected silane and the crystalline aluminosilicate zeolite are contacted in the preferred procedure at an elevated temperature. Preferably, the silane and zeolite are contacted on a weight basis of about 1:5 to 5:1, preferably about 1:2 to 1:1, respectively. It is also preferable that a binder for the zeolite be employed such as, for example, bentonite. For good contact between the reactants, it is also preferable to employ a reaction medium. Satisfactory reaction media include the ethers, aliphatic hydrocarbons and halo-substituted aliphatic hydrocarbons of five to about eight carbon atoms, (e.g., n-heptane), the aromatic, halo-substituted aromatic hydrocarbons and nitrogen containing compounds such as heterocyclics. A particularly preferred media is pyridine.

As indicated, an elevated temperature should also be employed for the reaction, preferably a temperature of about 75° to 200°C. A convenient procedure is to charge the reactants to the medium and heat at the reflux point of the system for about 1 to 10 hours. The mixture is then contacted with a volatile solvent such as chloroform or n-pentane, filtered and dried in an oven at a temperature of about 75° to 125°C.

The resulting modified zeolite may be described as a crystalline aluminosilicate having the organic substituted silane chemically bonded thereto and the resulting zeolite is thermally stable.

The carriers which may be employed are discussed hereinabove. Also, the process may be carried out in either a batch or continuous operation. The sorbed material can be subsequently recovered by conventional desorbing techniques such as thermal stripping, stripping with an inert gas, e.g., nitrogen, helium, etc. or evacuation or elutriation with a suitable polar or nonpolar stripping agent, e.g., water, n-hexane, etc.

The following examples will illustrate the best mode contemplated for carrying out the present invention.

EXAMPLES 1–4

Typical preparations of ZSM-5 type zeolites are shown in these examples. Examples 1–3 show the preparation of the hydrogen form ZSM-5 and they involve the use of tetrapropylammonium hydroxide (TPAOH) or bromide (TPABr). Example 4 shows a typical preparation of the hydrogen form ZSM-8 using tetraethyl ammonium hydroxide (TEAOH). Reaction conditions and results are shown in Table 1.

TABLE 5

|  | 1 | 2 | 3 | 4 |
|---|---|---|---|---|
| Reaction Composition | 30 g. $NaAlO_2$<br>720 g. Ludox<br>1,025 g. of 2.2 N TPAOH | 281 g. sorbead fines<br>3.3 lb. TPABr solution | 0.56 lb. $NaAlO_2$<br>44.7 lb. Q-brand<br>5.6 lb. TPABr<br>16.7 lb. NaCl<br>4.5 lb. $H_2SO_4$<br>132.0 lb. $H_2O$ | 13 g. $NaAlO_2$<br>300. g 40% TEAOH<br>300. g $H_2O$<br>1,000 g. Ludox. |
| Reaction temperature (° C.) | 150 | 100 | 100 | 193. |
| Time (hr.) | 168 | 168 | 327 | 144. |

Washed dried at 230° F., calcined 16 hrs. at 1,000° F.

| | $NH_4Cl$ solution | | | |
|---|---|---|---|---|
| Base exchange: | | | | |
| Conc. (wt. percent) | 25 | 5 | 25 | 25. |
| Temp. (° C.) | 90 | 25 | 90 | 90. |
| Contacts pelleted | ×3 | ×4 | ×3 | ×3. |
| Calcined: | | | | |
| (hr.) | 16 | 10 | 16 | 16. |
| (° F.) | 1,000 | 1,000 | 1,000 | 1,000. |
| Steamed: | | | | |
| (hr.) | 14 | 24 | 14 | 14. |
| (° F.) | 1,200 | 1,200 | 1,200 | |
| (p.s.i.a) | 15 | 30 | 15 | 15. |
| Chemical composition (g./100 g.): | | | | |
| Na | 0.08 | 0.23 | 0.02 | .5. |
| $Al_2O_3$ | 4.7 | 2.2 | 3.0 | 3.0. |
| $SiO_2$ | 96.9 | 95.3 | 94.8 | 95.9. |
| X-ray type | ZSM-5 | ZSM-5 | ZSM-5 | ZSM-8. |

EXAMPLE 5

In this example 30 parts of a ZSM-5 crystalline aluminosilicate zeolite of the type prepared in Examples 1–4 comprising 80 parts ZSM-5 and 20 parts bentonite binder, were refluxed with octadecyltrichlorosilane in a weight ratio of 1:1 in 200 cc normal-heptane solvent for a period of 4 hours. Thereafter the resulting solid product was recovered by decantation, the solid washed first with chloroform, then with normal-pentane and then dried at a temperature of 125°C. for 4 hours.

EXAMPLE 6

In this example a two column set-up was provided with the two columns in series, each column being 1 inch in diameter and 9 inches long. The end of each column was provided with a multi-part valve opening to the column. The valve at the top of the first column was provided with an inlet for the entry of feed and helium carrier gas. The valve at the bottom of the first column was provided with a line to a cooling condenser for meta-xylene and ortho-xylene recovery and a line leading to the three-way valve at the top of the second column. An additional line was provided at the top of the second column for the addition of make-up helium carrier gas. A thermal-conductivity detector was used at the outlet of each column to follow their elution profiles. The three-way valve at the end of the second column provided an outlet opening leading to a condenser for the para-xylene and a second condenser for the meta-xylene, ortho-xylene and ethylbenzene.

Each of these columns was was packed with 77 grams of the modified zeolite prepared in accordance with Example 5 and maintained at a temperature of 180°C. for conducting the separation. The feed stock was pumped to the top of column 1 at the rate of 0.4 grams of feed per hour per gram of the zeolite absorbent and the carrier gas was added at the rate of 15 moles of carrier gas per mole of feed per hour. The feed stock contained 15 weight percent ethylbenzene, 18 weight percent para-xylene, 41 weight percent meta-xylene and 26 weight percent ortho-xylene. The mixtures were allowed to pass through the chromatographic column and fractions were eluted from the column using the helium flow as the stripping agent. On recovery of the products it was discovered that there had been recovered para-xylene in a purity of 99.3 percent with a yield recovery of 17 grams or 94.4 percent.

EXAMPLE 7

The process of Example 6 was repeated except that three columns were used; 9, 9 and 18 inches in length respectively. Valves separated the three columns for use as take-off points. The column was forty inches long, one inch in diameter and contained three evenly distributed sections packed with 308 grams of the zeolite with the first and second columns containing 77 grams each and the third column containing 154 grams. Using the same feed rates, 99.4 percent para-xylene was recovered in a yield of 92.5 percent.

EXAMPLE 8

The process of Example 6 was repeated except that the zeolite was an unmodified ZSM-5 zeolite as produced in Example 1 to 4. Using the same feed rates and conditions there was recovered para-xylene in a purity of 94.8 percent in a yield of 93.5 percent.

The invention has been described herein with reference to certain preferred embodiments. However, it is not to be considered as limited thereto as obvious variations thereon will become apparent to those skilled in the art.

What is claimed is:

1. A process for the separation of an aromatic mixture containing para-xylene, meta-xylene, ortho-xylene and ethylbenzene for the recovery of high purity para-xylene therefrom which comprises contacting said mixture chromatographically with an adsorbent in at least two distinct stages whereby para-xylene and ethylbenzene are selectively absorbed whereas the meta-xylene and ortho-xylene are not adsorbed, removing the unadsorbed meta-xylene and ortho-xylene, eluting the para-xylene followed by the ethylbenzene wherein said adsorbent is a ZSM-5 or ZSM-8 crystalline aluminosilicate zeolite or mixtures thereof.

2. A process according to claim 1 wherein the process is conducted in at least two chromatographr columns with adsorbent in each column.

3. A process according to claim 1 wherein the process is conducted in a single chromatographic column having at least two distinct stages therein containing adsorbent.

4. A process according to claim 1 wherein the adsorbent is maintained in the said stages is maintained at an elevated temperature, and said mixture and carriers are passed therethrough.

5. A process according to claim 4 wherein said carrier is selected from the group consisting of steam, water, nitrogen, air, helium, hydrogen, hydrocarbons and mixtures thereof.

6. A process according to claim 5 wherein the elevated temperature ranges from about 100° to about 250°C.

7. A process according to claim 6 wherein the unadsorbed meta-xylene and ortho-xylene mixture is removed from the system after the first stage.

8. A process according to claim 7 wherein the absorbent is a modified zeolite reaction product of a ZSM-5 or ZSM-8 crystalline aluminosilicate zeolite with an organic radical-substituted silane of the formula:

wherein R is an organic radical and each $R_1$ is an organic radical the same as R, hydrogen or a halogen atom, provided that at least one $R_1$ is halogen, by contacting said mixture with said modified zeolite, whereby said components are sorbed at different respective rates by said modified zeolite and recovering the para-xylene.

9. A process according to claim 7 wherein the zeolite is selected from the group consisting of ZSM-5 type zeolites having the X-ray diffraction pattern of Table 1, ZSM-8 zeolites having the X-ray diffraction pattern of Table 4 and mixtures thereof.

10. A process according to claim 9 wherein, in preparation of the modified zeolite, the zeolite and silane are reacted in weight ratios of about 5:1 to 1:5, respectively, in the presence of an organic solvent.

11. A process according to claim 10 wherein the organic solvent is pyridine and the reaction is carried out at a temperature of about 75° to 200°C.

12. A process according to claim 11 wherein the silane compound is of the formula:

wherein R is an alkyl group of one to about 40 carbon atoms, an alkyl or aryl acyl group where the organic portion of said alkyl group contains about one to 30 carbon atoms, and of said aryl group contains about six to 24 carbon atoms, aryl groups of about six to 24 carbon atoms, alkaryl and aralkyl groups containing about seven up to about 30 carbon atoms and each $R_1$ is the same as R, hydrogen, or a halogen atom, providing that no more than one $R_1$ is the same as R and at least one $R_1$ is halogen.

13. A process according to claim 12 wherein the stages are at least two separate chromatographic columns, each containing said adsorbent, said feed and carrier are introduced into the top of the first column, the unadsorbed meta-xylene and ortho-xylene are removed from the bottom of the first column, the adsorbed products are eluted from the first column directly into the second column where they are again adsorbed and the para-xylene is recovered by elution from the bottom of the last column.

14. A process according to claim 13 wherein two columns are used and the para-xylene is recovered from the second column.

15. A process according to claim 12 wherein the stages are at least two separate sections in a single chromatographic column, each section containing said adsorbent, said feed and carrier are introduced into the top of the first section, the unadsorbed meta-xylene and ortho-xylene are removed from the bottom of the first section, the adsorbed products are eluted from the first section directly into the second section where they are again adsorbed and the para-xylene is recovered by elution from the bottom of the last section.

16. A process according to claim 15 wherein two sections are used and the para-xylene is recovered from the second section by elution.

* * * * *

UNITED STATES PATENT OFFICE
CERTIFICATE OF CORRECTION

Patent No. 3,724,170           Dated April 3, 1973

Inventor(s) Paul T. Allen, B. M. Drinkard, Edward H. Unger

It is certified that error appears in the above-identified patent and that said Letters Patent are hereby corrected as shown below:

In Table 2, under heading "$AgNO_3$", the value 4.46 appearing at column 9, line 68 should read -- 7.46 --;

Column 16, line 10, Table 1 should read -- Table 5 --.

Signed and sealed this 19th day of February 1974.

(SEAL)
Attest:

EDWARD M. FLETCHER, JR.
Attesting Officer

C. MARSHALL DANN
Commissioner of Patents